United States Patent [19]

Allert

[11] Patent Number: 4,677,712
[45] Date of Patent: Jul. 7, 1987

[54] HOSE CLAMP WITH TIGHTENER

[75] Inventor: Kurt Allert, Oberndorf am Neckar, Fed. Rep. of Germany

[73] Assignee: Kurt Allert GmbH & Co. KG, Oberndorf am Neckar, Fed. Rep. of Germany

[21] Appl. No.: 777,842

[22] Filed: Sep. 18, 1985

Related U.S. Application Data

[63] Continuation-in-part of Ser. No. 679,361, Dec. 7, 1984, abandoned.

[30] Foreign Application Priority Data

Jun. 30, 1984 [DE] Fed. Rep. of Germany ... 8419624[U]

[51] Int. Cl.⁴ .............................................. B65D 63/00
[52] U.S. Cl. ................................. 24/274 R; 24/274 P; 24/279
[58] Field of Search .......... 24/274 R, 274 P, 274 WB, 24/275, 276, 279, 280

[56] References Cited

U.S. PATENT DOCUMENTS

| | | | |
|---|---|---|---|
| 2,383,920 | 8/1945 | Seaholm | 24/274 R |
| 2,405,913 | 8/1946 | Tinnerman | 24/274 R |
| 2,504,836 | 4/1950 | Hill | 24/274 R |
| 2,825,113 | 3/1958 | Schaefer | 24/274 R |
| 3,116,529 | 1/1964 | Henning | 24/274 R |
| 3,175,271 | 3/1965 | Schukraft | 24/274 P |
| 3,303,544 | 2/1967 | Nigon | 24/274 R |
| 3,351,989 | 11/1967 | Cheris et al. | 24/274 R |
| 3,528,142 | 9/1970 | Lodholm | 24/274 R |
| 3,747,172 | 7/1973 | Tarzian | 24/274 R X |
| 3,900,932 | 8/1975 | Allert | 24/274 R |
| 4,221,030 | 9/1980 | Bernede | 24/274 R |
| 4,300,270 | 11/1981 | Sauer | 24/274 R |
| 4,445,254 | 5/1984 | Allert | 24/274 R |

FOREIGN PATENT DOCUMENTS

| | | | |
|---|---|---|---|
| 212299 | 1/1958 | Australia | 24/274 P |
| 1445626 | 6/1966 | France | 24/274 R |
| 1484749 | 6/1967 | France | 24/274 P |
| 561382 | 4/1975 | Switzerland | 24/274 R |

Primary Examiner—Kenneth J. Dorner
Assistant Examiner—Laurie K. Cranmer
Attorney, Agent, or Firm—Antonelli, Terry & Wands

[57] ABSTRACT

A hose clamp which includes a metallic tightening strap and a tightener that has a housing to which the final portion of the tightening strap is adapted to be fastened as well as a rotatably mounted tightening worm cooperable with a gear tooth system of the tightening strap so as to enable an adjustment of the tightening strap. The final portion of the tightening strap is provided with a bent portion adapted to be inserted into a transverse slit provided in the bottom portion of the housing, with the transverse slit extending substantially at a right angle to the tightening strap. The bent part includes a cross bar which is adapted to be pressed onto a longitudinal wall of the transverse slit by a tension applied to the tightening strap when the tightening strap is tightened.

16 Claims, 6 Drawing Figures

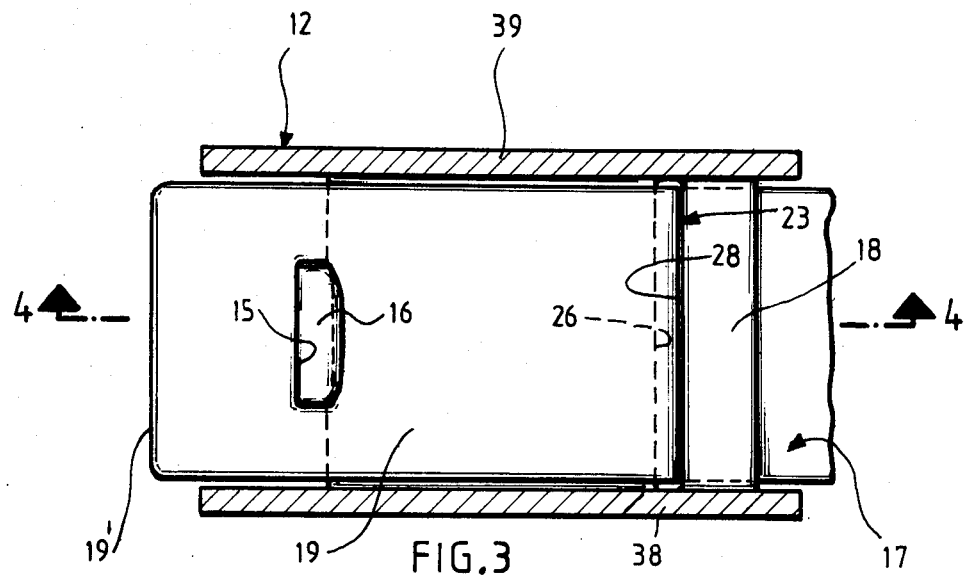
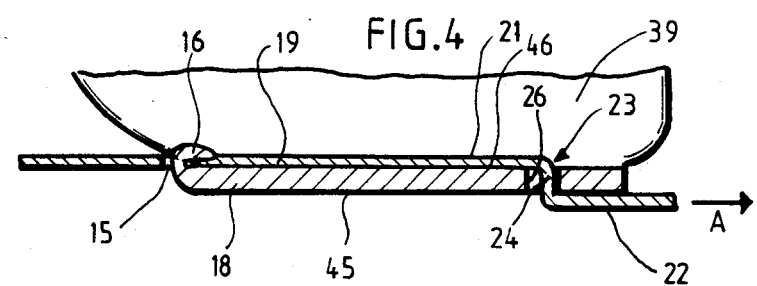

HOSE CLAMP WITH TIGHTENER

This application is a continuation-in-part application of U.S. application Ser. No. 679,361, filed Dec. 7, 1984 and now abandoned.

The present invention relates to a hose clamp and, more particularly, to a hose clamp which includes a metallic tightening s trap and a tightener means which includes a housing at the bottom of which a final or terminal portion of the tightening strap is to be fastened, with the tightener means including a rotatable tightening worm which cooperates with a gear tooth system of the tightening strap so as to enable an adjustment thereof.

In, for example, Offenlegungsschrift Ser. No. 3,120,112, a tightener of the aforementioned type is proposed wherein a final or terminal portion of the tightening strap is fastened to the bottom of a U-shaped housing of the tightener by lugs located at the front end and rear in a bottom of the housing, with the lugs projecting through perforations in the tightening strap and being bent around the tightening strap.

A disadvantage of the above proposed arrangement resides in the fact that, in situations which involve considerable tensile loads on the tightening strap, a holding of the tightening strap is often unsatisfactory since the tightening strap may be torn loose at the point where it is fastened to the bottom of the housing thus making the hose clamp unusable.

The aim underlying the present invention essentially resides in providing a hose clamp wherein an anchoring or securing of the final or terminal portion of the tightening strap to the bottom of a housing of the tightener is structurally simple but which nevertheless provides for a hose clamp which can tolerate high tensional loads on the tightening strap in a reliable manner.

In accordance with advantageous features of the present invention, the final or terminal portion of the tightening strap that is fastened to the bottom of the housing includes a bent part which maintains an anchor to the bottom of the housing in a tension proof manner. The bent part advantageously passes through an aperture of the bottom of the housing which is shaped as a transverse slit and which extends at right angles to the tightening strap so that a cross bar of the tightening strap formed by the bent part of the tightening strap is pressed onto a longitudinal wall of the transverse slit that is turned away from a free end of the final or terminal part of the tightening strap by the traction affecting the tightening strap when the tightening strap is tightened.

In accordance with the present invention, the bent part of the tightening strap, located in the transverse slit in the bottom of the housing of the tightener made by a two fold opposing bend, does not need to broken up by a perforation and, consequently, does not need to be weakened in that manner and may readily transmit to the bottom of the housing the tension load which affects the terminal or final part of the tightening strap when the tightening strap is tightened over the entire width of the tightening strap.

By virtue of the features of the present invention, a form-closed anchoring of the tightening strap to the bottom of the housing makes it possible to transmit extremely high tension loads to the bottom of the housing and, a danger of tearing out or breaking of the fastening of the tightening strap to the bottom of the housing is precluded.

Moreover, since the tightening strap is usually weakened at its gear tooth system which cooperates with the tightening worm gear by the gear tooth system, it is more likely that the gear tooth system of the tightening strap will be pulled out than the fastening of the tightening strap to the bottom of the housing will be pulled out. Consequently, by virtue of the features of the present invention, it is possible to use a maximum tension load on the tightening strap without the danger of a tearing loose of the fastening of the tightening strap to the bottom of the housing.

Additionally, by virtue of the present invention, an installation of the tightening strap on the bottom of the housing may be accomplished in an extremely simple and inexpensive manner since the tightening strap is connected with the bottom of the housing in the transverse slit provided in the bottom of the housing at a point where it is bent in a formclosed manner; therefore, it is only necessary to insert the tightening strap into the transverse slit in the bottom of the housing.

Advantageously, in accordance with the present invention, the metallic tightening strip is made of steel; however, as can readily be appreciated, other metals such as brass or the like can be used in many instances. Moreover, it is advantageous for the tightening strap to be elastically pliable; however, it is also possible and, in many cases it may be practical, for the tightening strap to be essentially unelastically pliable.

The thickness of the tightening strap may, in accordance with the present invention, lie in the range of, for example, 0.5 to 1.5 mm, with a width of 5 to 20 mm; however, as can be appreciated, the thickness and width can be greater or less than the above noted ranges depending upon the particular application.

In order to ensure that the tightening strap cannot be pulled out of the transverse slit, when installing the tightening strap, preferably the tightening strap is inserted through the transverse slit until the cross bar of the bent portion lies in the transverse slit. The installation of the tightening strap may be advantageously facilitated by locating a narrow lug forming a single piece with the bottom of the housing in the bottom of the housing and passing the lug through a hole fashioned by a perforation in the tightening strap with the lug being bent around an upper side of the tightening strap.

However, advantageously, the lug need not participate at all in the transmission of the tension load on the tightening strap to the bottom of the housing so that the lug may pass through the hole in the tightening strap intended for that purpose without any difficulty and with some play. Consequently, the lug only needs to serve the purpose of securing the final or terminal part of the tightening strap that is fastened to the bottom of the housing against the upper turning movements of the bottom of the housing so that the lug does not swing away from the bottom of the housing.

It is also possible in accordance with the present invention to secure the final or terminal part of the tightening strap against a swinging or movement away from the bottom of the housing by, for example, providing a substantially U-shaped perforation in both the longitudinal side walls of the housing or in only one of the longitudinal side walls of the housing, with the two arms of the substantially U-shape extending approximately to a point where the longitudinal side wall forms the bottom of the housing and with the lug, formed by the U-shape of the longitudinal side wall of the housing being bent around the tightening strap. In this manner, the tightening strap does not need any perforations to prevent any swinging or upward movement away from the housing.

In accordance with still further features of the present invention, the bent part of the terminal or end of the tightening strap is formed by two approximately rectangular opposing bends spaced from each other at a distance corresponding approximately to a height of the transverse slit in the bottom of the housing. Advantageously, the width of the transverse slit in the bottom of the housing is only somewhat larger than a thickness of the tightening strap.

Advantageously, according to the present invention, the tightening strap passes through the transverse slit in the bottom of the housing from an underside of the bottom of the housing in a direction of a free end of a final or terminal part of the tightening strap fastened to the bottom of the housing.

The narrow lug facilitating the installation of the tightening strap, in accordance with the present invention, functions as a safety means and is advantageously located between the transverse slit in the bottom of the housing and a free end of the terminal or final part of the tightening strap. The lug may be formed by providing a perforation in one longitudinal side wall of the housing and, as noted above, may be bent around the tightening strap. It is also possible, according to the present invention, for the terminal or final part of the tightening strap, held on the housing body, to be bent in a hook shape by approximately 180° about a rearward end of a bottom portion of the housing.

Advantageously, according to still further features of the present invention, a zone or portion of the tightening strip bent around the rearward end of the bottom portion of the housing extends approximately up to the transverse slit of the bottom portion of the housing.

The clamping strap may, in accordance with the present invention, penetrate the transverse slit of the bottom portion of the housing in a direction toward the rear end of the housing bottom, with the penetration occurring from an underside of the bottom portion of the housing.

Accordingly, it is an object of the present invention to provide a hose clamp with a metallic tightening strap which avoids, by simple means, shortcomings and disadvantages encountered in the prior art.

Another object of the present invention resides in providing a hose clamp which is structurally simply, inexpensive and extremely safe to operate.

A still further object of the present invention resides in providing a hose clamp with a metallic tightening strap which is capable of withstanding high tension loads.

A still further object of the present invention resides in providing a hose clamp with a metallic tightening strap which minimizes if not avoids the danger of a loosening between the tightening strap and a housing of the hose clamp.

These and other objects, features, and advantages of the present invention will become more apparent from the following description when taken in connection with the accompanying drawings which show, for the purpose of illustration only, several embodiments in accordance with the present invention, and wherein:

BRIEF DESCRIPTION OF THE DRAWINGS:

FIG. 3 is a partial cross-sectional view, on an enlarged scale, taken along the line III—III illustrating a final or terminal part of the tightening strap fastened to a bottom of the housing of the hose clamp;

FIG. 4 is a cross-sectional view taken along the line IV—IV in FIG. 3;

Figure 2:
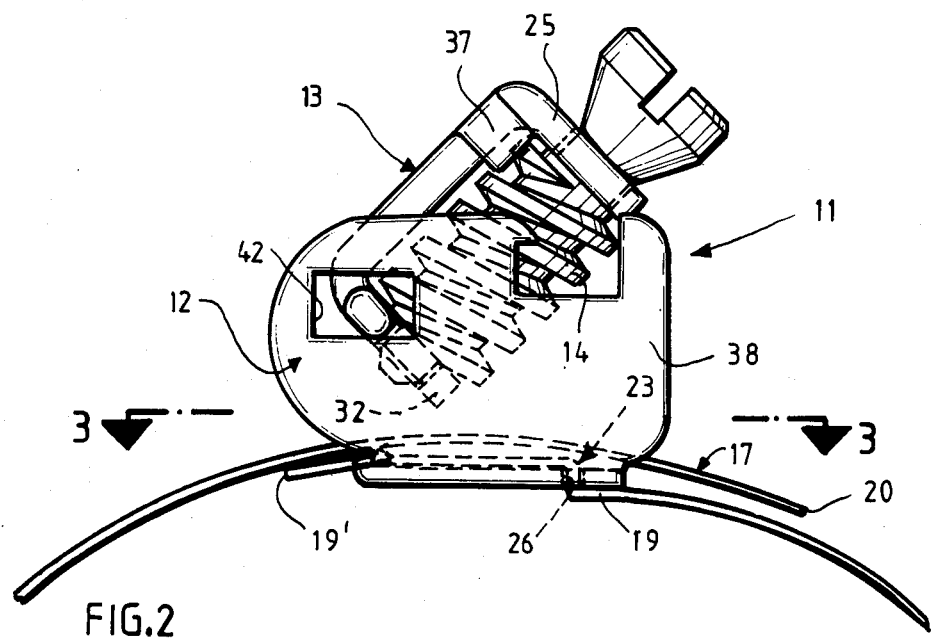
FIG. 2 is a side view of the hose clamp of FIG. 1 with the hinged cover in an open position.
Figure 1:
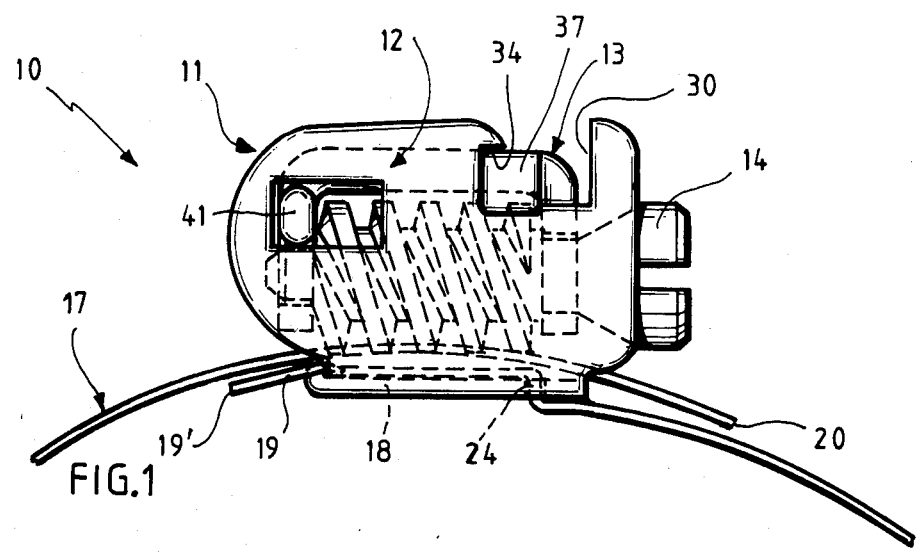
FIG. 1 is a side view of a hose clamp constructed in accordance with the present invention with a closed hinged cover.

Referring now to the drawings wherein like reference numerals are used throughout the various views to designate like parts and, more particularly, to FIGS. 1 and 2, according to these figures, a hose clamp generally designated by the reference numeral 10 has a rapid locking apparatus which includes a rapid tightener generally designated by the reference numeral 11 formed of a housing generally designated by the reference numeral 12 and a hinged cover generally designated by the reference numeral 13, with a tightening worm 14 being rotatably accommodated in the hinged cover 13. A tightening strap generally designated by the reference numeral 17 is provided with ordinary helical gearing and includes a final or terminal portion 19 fastened to a bottom housing portion 18 of the housing 12, which has a generally U-shape when viewed from the front.

The fastening device includes a transverse slit 26 provided in the bottom of the housing portion 18, with the transverse slit 26 having a length which is somewhat greater than a constant width of the tightening strap 17 over an entire length of the tightening strap 17. The width of the transverse slit 26 is somewhat greater than the constant thickness of the tightening strap 17. The transverse slit 26 serves the purpose of providing a form-closed fastening of the final or terminal part of the tightening strap by fashioning the final or terminal part of the tightening strap 17 so as to have a bent part or elbow generally designated by the reference numeral 23 at the transverse slit 26.

The bent part of elbow 23 is formed by two opposing right angle bends in the tightening strap 17 which extend over an entire width of the tightening strap 17, with no holes or apertures being provided therein. A distance between the bends forming the bent part or elbow 23 corresponds approximately to a thickness of the bottom housing portion 18 and, consequently, approximately to a height of the tranverse slit 26. Consequently, a cross bar 24 of the tightening strap 17, formed by the bent part or elbow 23, lies in the transverse slit 26, and the cross bar 24 is approximately perpendicular to the sides of the bottom housing portion 18. Accordingly, the cross bar has the same width and thickness as the longitudinal parts 21, 22 of the tightening strap 17 adjoining thereto, with the longitudinal parts 22 on the lower side 45 of the bottom housing portion 18, turned away from the free end 19' of the final or terminal part 19 of the tightening strap 17 with respect to the cross bar 24, and the longitudinal part 21 leading from the cross bar 24 to the free end 19', lying on an upper side 46 of the bottom housing portion 18, is located inside the housing 12.

The U-shaped housing of the tightener includes two parallel disposed longitudinal side walls 38, 39 which are bent at right angles to the bottom of the housing 18, with a spacing between the side walls 38, 39 having a width which is somewhat greater than a width of the tightening strap 17. The transverse slit in the bottom housing portion 18 extends from one longitudinal side wall 38 to the other longitudinal side wall 39 so that a tightening strap may pass therethrough to its full width. With the tightening strap 17 being in a non-tightened condition, the cross bar 24 lies loosely in the transverse slit 26 of the bottom housing portion 18. On the other hand, when the tightening strap 17 is tightened, as shown most clearly in FIG. 4, the final or terminal part 19 of the tightening strap 17 is pulled in a direction of the arrow A and, consequently, the cross bar 24 is pressed down on the right hand longitudinal side wall 28 of the transverse slit 26 thereby holding the tightening strap 17 to the bottom housing portion 18 and, in this manner, transmitting all of the tension load exerted on the final or terminal part 19 in the direction of the arrow A to the bottom housing portion 18 so that a tension-proof connection between the final or terminal part 19 of the tightening strap 17 and the bottom housing portion 18, required for holding the tightening strap when it is tightened, is brought into being by the bent part 23 of the final or terminal part 19 of the tightening strap 7 passing through the transverse slit 26.

Since the bent part 23 of the final part 19 of the tightening strap 17 is not firmly connected to the bottom housing portion 18, a safety device is provided of preventing the terminal or final part 19 of the tightening strap 17 from swinging away from the bottom housing portion 18 which, as a practical matter, only serves for the purpose of ensuring that the cross bar 24 remains in the transverse slit 26.

As shown most clearly in FIG. 4, the safety device includes a lug 16 which is formed as a single piece with the bottom housing portion 18, and those two elements form a single piece at the end of the lug 16 which adjoins the end 19' of the final or terminal part 19 of the tightening strap 17. The lug 16 passes through a hole formed by a perforation in the tightening strap 17 and is bent around an upper part of the final or terminal part 19 of the tightening strap 17 that lies on the bottom of the housing 18 as shown most clearly in FIGS. 3 and 4. The safety device does not serve the purpose of transmitting the tension loads of the tightening strap 17 to the bottom housing portion 18 and, consequently, the lug 16 can pass through the perforation 15 in the tightening strap 17 without difficulty and with play around the peripheral portion of the lug 16.

Beginning from the final or terminal portion 19, the tightening strap 17 extends back to the housing 12 in a circle with the other free end 20 of the tightening strap being lead through the housing 12 above the final or terminal part 19 of the tightening strap which is fastened down and, consequently, it is possible to pull the tightening strap 17 through the housing 12 by hand, at will, when the hinged cover is in the open position illustrated in FIG. 1.

When the tightening strap 17 spans a hose or similar member that is to be fastened to a connection piece or the like, it is possible to tighten the tightening strap 17 by hand as far as possible when the hinged cover 13 is in the open position. Subsequently, the hinged cover 13 is folded from the open position of FIG. 1 into the closed position of FIG. 2 and, consequently, a screw of the tightening worm gear 14 engages with the gear tooth system of the tightening strap 17. At this stage, the tightening strap 17 can no longer be moved by hand but only by rotating the tightening worm gear 14.

The tightening worm gear 14 is rotatably mounted in the hinged cover 13 and, for this purpose, the hinged cover 13 has substantially U-shaped configuration when viewed laterally, with a point of the worm gear 14 passing through a drilled hole for a bearing in the rear arm 32 of the hinged cover 13 and a neck of the worm gear 14, having a reduced diameter, located opposite the screw of the tightening worm gear 14. A head of the tightening worm gear 14 is introduced into a slit in the front arm 25 of the hinged cover 13 which is open at the bottom, and two cross bars forming the slit are bent toward each other beneath the neck of the tightening worm gear so that the neck rests in the longitudinally extending slit in the front arm 25 in such a manner that it is rotatable but fixed from axial displacement. The head of the worm gear 14 may be provided with, for example, a slit for a screw driver; however, it is also possible to provide other types of heads and, preferably, heads formed as hexagonal recesses.

As shown most clearly in FIG. 1, on a top part of the housing near the right hand side longitudinal end thereof, each of the two longitudinal side walls 38, 39 of the housing 12 are provided with an indentation 30 which opens toward the top for accommodating lugs projecting from both longitudinal sides of an upper middle flange of the hinged cover 13, which lugs are adapted to lie in the two indentations 30 when the hinged cover 13 is closed. A rear arm 32 of the hinged cover 13 is provided with two projections extending out from sides thereof, with the projections forming pivot pins 41 adapted to engage in oblong holes 42 in the two longitudinal side walls 38, 39 for supporting the hinged cover as it swings and shifts longitudinally. Each of the two oblong holes 42 are disposed in parallel with the housing 12, that is, the longitudinal side walls 38, 39 parallel the tightening strap 17.

As also shown in FIG. 1, each of the two indentations 30 are provided with a rectangularly shaped back taper 34 for accommodating the two lugs 37 at its end adjoining the swing support for the hinged cover 13, with the two lugs 37 being adapted to engage the rectangular back tapers 34 to arrest the hinged cover 13 thereby preventing an impended opening of the hinged cover 13.

When the hose clamp 10 is tightened on a hose passing therethrough by rotating the tightening worm gear 14, the tightening strap 17 pulls the bent part 23 in the direction of the arrow A and, consequently, the cross bar 24 is pressed onto the longitudinal side wall of the transverse slit 26 on the right hand side as shown in FIG. 4 thereby transmitting the tension load exemplified by the arrow A only or essentially only to the bottom housing portion 18 of the housing 12 along its length by these means. Since the tightening strap 17 is not weakened in an area of the transverse slit 26, and since the bent part 23 extends across an entire width of the tightening strap 17, an optimal transmission of the tension load exemplified by the arrow A to the bottom housing portion 18 takes place with no danger of a tearing out of the fastening.

It may be advantageous to omit the safety device or lug 16 or some other safety device in many cases particularly if, in use, it is desired to have the possibility of replacing the tightening strap 17 simply by removing the tightening strap 17 from the transverse slit 26 and inserting therein a new tightening strap 17, a shorter or longer tightening strap, or a tightening strap with greater stability. The amount of space taken up by the hose clamps 10 when they are packed can be reduced and storage can then be simplified by packing the tighteners 11 and the tightening straps 17 separately.

Figure 5:
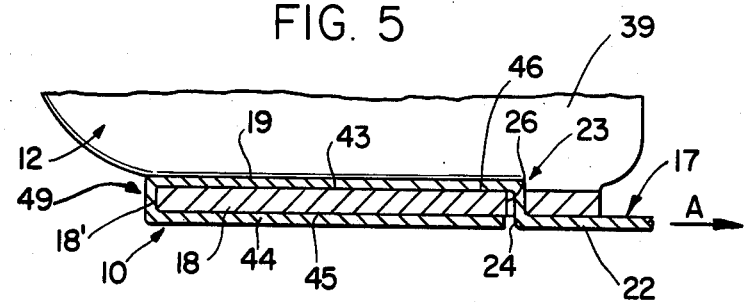
FIG. 5 is a partial cross-sectional view of a hose clamp constructed in accordance with another embodiment of the present invention.

In FIG. 5, the end of the housing 12 at which the terminal part 19 of the associated tightening strap 17 is anchored differs from that of FIG. 4 by virtue of the fact that lugs 16 have been omitted from the housing bottom portion 18, and the terminal or final part 19 of the tightening strap 17 having the bent portion 23 extending through the transverse slit 26 and the housing bottom part does not have a perforation 15 as with the embodiment of FIG. 4 but rather is bent in a hook shape by 180° around the rearward end 18' of the housing bottom portion 18. Thus, the tightening strap 17 contacts, with a portion 43, an approximately planar top side of the housing bottom portion 18 and is then bent about a rearward end 18' of the housing bottom portion 18 and lies with the bent portion 44 against an approximately planar underside 45 of the housing bottom portion 18. The bent portion 44 extends approximately up to the transverse slit 26 so that the bent portion 44 of the tightening strap 17 is approximately aligned with the longitudinal parts 22 of the tightening strap 17 that is located directly in front of the bent portion 23 and is likewise in contact with the underside of the housing bottom portion 18. The tensile stress to which the tightening strap section is exposed during tensioning of the hose clamp 10 is denoted by the arrow A. The hook-shaped bending of the tightening strap 17 about the rearward end 18' of the housing bottom portion 18 yields, in a structurally simple manner, and especially firm holding of the bent portion 23 in the transverse slit 26 and permits especially high clamping forces in the direction of the arrow A without any danger of a detachment of the terminal or final part 19 of the tightening strap 17 from the housing bottom portion 18. Therefore, the tightening strap 17 can withstand particularly great forces.

Figure 6:
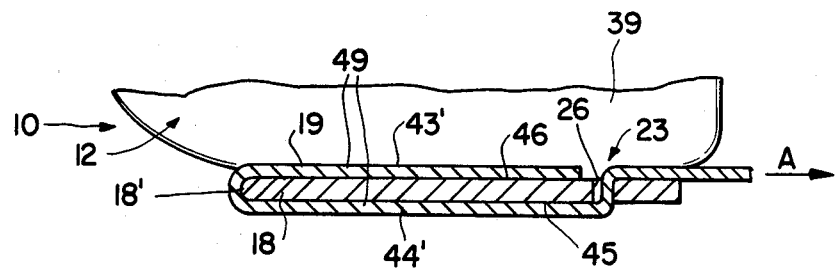
FIG. 6 is a partial cross-sectional view of a further embodiment of a hose clamp constructed in accordance with the present invention.

In the embodiment of FIG. 5, as well as in the embodiments of FIGS. 1-3, the tightening strap 17 is in each case arranged at the housing bottom portion 18 so that it penetrates through the transverse slit from an underside 45 of the housing bottom portion 18 and extends in a direction toward the rearward end 18' of the housing bottom portion 18. However, it is also possible as shown most clearly in FIG. 6 to modify the embodiment of FIG. 5 by providing for the tightening strap 17 to penetrate the transverse slit 26 of the housing bottom portion 18 coming from the top side 46 of the housing bottom portion 18 and extending in a direction of the rearward end 18' of the housing bottom portion 18. In the embodiment of FIG. 6, the tightening strap 17 is bent by 180° about the rearward end 18' of the housing bottom portion 18 as in FIG. 5, and can suitably extend up to approximately the transverse slit 26 of the housing bottom portion 18, with a portion 44' of the tightening strap 17 lying flush against the underside 45 and the tightening strap portion 43' lying flush against the top side 46 of the housing bottom portion 19.

In both embodiments of FIGS. 5 and 6, the end section 44 and 43', respectively, of the tightening strap 17, bent by 180°, is prevented from unbending, in the case of the embodiment of FIG. 5, by the hose encompassed by the tightening strap 17, and, in the case of the embodiment of FIG. 6, by a tightening strap portion (not shown) which comes to lie above the bent portion 43' of the tightening strap 17, which tightening strap portion exhibits the serration meshing with the respective clamping screw.

In the embodiments of FIGS. 5 and 6, the hook 49 created by the portions 43, 44 or 43', 44' and their connection can also participate in absorbing tensile forces of the tightening strap 17 acting in the direction of the arrow A so that the tensile force need not be absorbed essentially solely by the bent portion 23 but rather the hook 49 can considerably participate in this process, which still further raises the tensile forces that can be applied. Additionally, the terminal part 19 of the tightening strap 17 does not require any perforations and, consequently, is not weakened. The bent-over portions 44 and 43' of the tightening strap 17 can, at least in many instances, be even shorter than illustrated in the drawings and, for example, the bent-over portions 44 and 43' may have a relatively large spacing from the transverse slit 26 thereby saving material. However, long bent-over portions 44 and 43', respectively, of the tightening straps 17 are especially advantageous for anchoring at the housing bottom portion 18. In the embodiment of FIG. 5, an especially satisfactory contact of the tightening strap 17 with the respective hose is also obtained if the portion 44 of the tightening strap 17 extends approximately up to the transverse slit 26, preferably in close proximity of the cross bar 24 or in abutment against the cross bar 24 of the bent portion 23 of the tightening strap 17.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A hose clamp comprising:
   a metallic tightening strap;
   a tightener means including a housing having a bottom portion to which a terminal portion of the tightening strap is fastened, and a rotatably mounted tightening worm gear means cooperable with a gear tooth system of the tightening strap for enabling an adjustment of the tightening strap;
   a bent part provided in a terminal portion of the tightening strap for enabling a fastening of the tightening strap to the bottom of the housing in a tension-proof manner;
   a transverse slit including a pair of longitudinal walls provided in a bottom portion of the housing extending substantially at a right angle to the tightening strap for accommodating the bent part, said transverse slit having a width slightly larger than a thickness of the tightening strap;
   wherein the bent part forms a cross bar adapted to be pressed onto one longitudinal wall of the transverse slit by a tension applied to the tightening strap, the bent part is formed by two approximately rectangular bends spaced from each other at a distance corresponding approximately to a height of the transverse slit; and wherein said longitudinal walls of the transverse slit extend substantially at a right angle to the tightening strap, said longitudinal walls having the same height and being arranged at the same level, so that said longitudinal walls are not staggered heightwise with respect to each other.

2. A hose clamp according to claim 1, wherein the tightening strap is made of steel.

3. A hose clamp according to claim 1, wherein the tightening strap is elastically pliable.

4. A hose clamp according to claim 1, wherein the tightening strap is essentially unelastically pliable.

5. A hose clamp according to claim 1, wherein the thickness of the tightening strap is in the range of 0.4 to 1.5 mm.

6. A hose clamp according to claim 1, wherein a width of the tightening strap is in the range of 5 to 20 mm.

7. A hose clamp according to claim 1, wherein the tightening strap is inserted into the transverse slit from an underside of the bottom portion of the housing in a directon of the free end of the terminal part of the tightening strap.

8. A hose clamp according to claim 1, wherein the tightening strap is inserted into the transverse slit from an underside of the bottom porton of the housing in a direction of the free end of the terminal part of the tightening strap.

9. A hose clamp according to claim 1, wherein a further bent part is provided in a terminal portion of the tightening strap and is bent in a hook shape approximately 180° about a rearward end of the bottom portion.

10. A hose clamp according to claim 9, wherein the further bent part extends approximately up to the transverse slit provided in the bottom portion.

11. A hose clamp according to claim 1, wherein the tightening strap penetrates into the transverse slit provided in the bottom portion from an underside of the bottom portion to a top side thereof and extends toward a rearward end of the bottom portion.

12. A hose clamp according to claim 1, wherein the tightening strap abuts one side of the housing bottom in front of the transverse slit and abuts the other side of the housing bottom, as viewed lengthwise along the housing bottom.

13. A hose clamp as claimed in claim 1) further comprising a safety means for preventing the terminal portion of the tightening strap from being pulled out of the transverse slit in the bottom portion of the housing.

14. A hose clamp according to claim 13, wherein the safety means is disposed between the transverse slit and the free end of the terminal portion of the tightening strap.

15. A hose clamp according to claim 14, wherein the safety means includes at least one lug formed by a perforation in one longitudinal side wall of the housing, and wherein said at least one lug is bent around the tightening strap.

16. A hose clamp according to claim 14, wherein the safety means includes a lug in the bottom portion of the housing, said tightening strap includes a hole through which the lug extends, and wherein the lug is bent around the tightening strap.

* * * * *